(12) United States Patent
M

(10) Patent No.: US 12,293,364 B2
(45) Date of Patent: May 6, 2025

(54) SYSTEMS AND METHODS FOR PERFORMING SECURE TRANSACTIONS

(71) Applicant: Citrix Systems, Inc., Fort Lauderdale, FL (US)

(72) Inventor: Jaganmohan M, Pompano Beach, FL (US)

(*) Notice: Subject to any disclaimer, the term of this patent is extended or adjusted under 35 U.S.C. 154(b) by 611 days.

(21) Appl. No.: 17/568,244

(22) Filed: Jan. 4, 2022

(65) Prior Publication Data
US 2023/0214825 A1    Jul. 6, 2023

(51) Int. Cl.
*G06Q 20/40* (2012.01)
*H04L 9/40* (2022.01)

(52) U.S. Cl.
CPC ......... *G06Q 20/4014* (2013.01); *H04L 63/10* (2013.01)

(58) Field of Classification Search
CPC ... G06Q 20/4014; H04L 63/10; H04L 63/123; H04L 63/0823; G06F 2221/2141; G06F 21/6218
See application file for complete search history.

(56) References Cited

U.S. PATENT DOCUMENTS

2020/0379829 A1* 12/2020 Vasilevskiy ............. G06F 16/27

* cited by examiner

*Primary Examiner* — Brian Whipple

(57) ABSTRACT

Described embodiments provide systems and methods for performing secure transactions. A first service executing on at least one server may receive a request from a second service for the first service to perform a transaction. The request may include an identifier of a record. An agent of the first service may determine, according to the identifier, whether the record is present in a storage. The storage may be accessible using credentials of the agent of the first service and an agent of the second service. The first service may send a response to the request if the record is present in the storage.

20 Claims, 8 Drawing Sheets

SYSTEMS AND METHODS FOR PERFORMING SECURE TRANSACTIONS

FIELD OF THE DISCLOSURE

The present application generally relates to systems and methods for performing transactions, including but not limited to systems and methods for performing secure transactions between services.

BACKGROUND

In current applications, a key is used to authorize transactions between services of a system. Moreover, a certificate can be used to establish a channel between the services. In certain cases, an attacker may gain access to the key or certificate. If the attacker gains access to the key or certificate, an administrator of the system can be unaware that the key/certificate has been leaked or compromised. In one example, the administrator can remain unaware of said leak for a period of time, such as until the administrator discovers that the attacker has accessed or used the key/certificate. As such, during said period of time, the system is exposed to security risks or threats.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for performing secure and/or authorized transactions (e.g., a set of operations on data) between services (e.g., micro services, desktop services, and/or hosted services). For instance, the systems and methods described herein can include one or more agents of at least one service (e.g., a trust module and/or component). The agent(s) of the service(s) may generate a record (e.g., an entry in a database for instance) for each transaction between at least two services. In one example, the agent(s) may add, incorporate, store and/or maintain said record in one or more storages (e.g., one or more transient storages). In one example, a second service may send a request to perform a transaction to a first service. The second service can use an agent to generate a record associated with (or corresponding to) the transaction. The agent of the second service may add, include and/or incorporate said record into one or more storages. In certain embodiments, the request may include and/or provide (e.g., provide to the first service) an identifier of the record. Responsive to receiving the request, an agent of the first service may determine whether the record (e.g., the record associated with the transaction) is present (e.g., is maintained and/or stored) in the storage. If the record is present in the storage(s), which can validate or authenticate the request, the first service may send, transmit and/or communicate a response to the request.

In one aspect, the present disclosure is directed to a method for performing secure transactions. The method can include receiving, by a first service executing on at least one server, a request from a second service for the first service to perform a transaction. The request may include an identifier of a record. According to the identifier, an agent of the first service may determine whether the record is present in a storage. The storage may be accessible using credentials of the agent of the first service and an agent of the second service. The first service may send a response to the request if the record is present in the storage.

In certain embodiments, the agent of the first service may access the storage using the credentials of the agent of the first service. The agent of the first service may locate the record in the storage using the identifier. In certain embodiments, a value of the record may include at least one of: an identifier of the transaction, an identifier of the second service, or a uniform resource locator (URL) of the request. In some embodiments, at least a first portion of the value may be encrypted using an encryption key of the second service. In certain embodiments, the method may comprise decrypting, by the agent of the first service, the first portion using a decryption key of the second service. In some embodiments, the agent of the first service may determine whether the decrypted first portion matches with information in the request. In certain embodiments, the first service may send the response to the request, if the decrypted first portion matches with the information in the request.

In certain embodiments, at least a first portion of the value may be encrypted using an encryption key of the second service. In some embodiments, at least a first portion of the value may be further encrypted using an encryption key of the agent of the second service. In certain embodiments, the method may comprise decrypting, by the agent of the first service, the first portion using a decryption key of the second service, and a decryption key of the agent of the second service. In some embodiments, the agent of the first service may determine whether the decrypted first portion matches with information in the request. In certain embodiments, the first service may send the response to the request, if the decrypted first portion matches with the information in the request.

In certain embodiments, at least a first portion of the value may be encrypted using a cryptographic salt of the agent of the second service. In some embodiments, the method comprises receiving, by the first service, the cryptographic salt in the request. In certain embodiments, the agent of the first service may decrypt the first portion using the cryptographic key and the cryptographic salt. In some embodiments, the record may be created in the storage by the agent of the second service. In some embodiments, the record may correspond to the transaction that is being requested. In certain embodiments, the first service and the second service may each comprise a micro-service. In some embodiments, the identifier may comprise a globally unique identifier. In certain embodiments, and according to the identifier, the agent of the first service may determine that the record is absent from the storage. In some embodiments, the first service may reject or ignore the request if the record is absent from the storage. In certain embodiments, the record may be absent from the storage because the record has been removed from the storage in accordance with an expiration of a time-to-live duration of the record. In some embodiments, the record may be absent from the storage because the record was never established into the storage by the agent of the second service.

In one aspect, the present disclosure is directed to a device comprising at least one processor of a first service. The at least one processor may be configured to receive via a transceiver, a request from a second service for the first service to perform a transaction. The request may include an identifier of a record. The at least one processor may be configured to determine, according to the identifier, whether the record is present in a storage. The storage may be accessible using credentials of an agent of the first service and an agent of the second service. The at least one processor may be configured to send, via the transceiver, a response to the request if the record is present in the storage.

In certain embodiments, the at least one processor can be configured to access the storage using the credentials of the agent of the first service. In some embodiments, the at least one processor may be configured to locate the record in the storage using the identifier. In certain embodiments, a value of the record may include at least one of: an identifier of the transaction, an identifier of the second service, or a uniform resource locator (URL) of the request. In some embodiments, at least a first portion of the value may be encrypted using an encryption key of the second service. In certain embodiments, the at least one processor may be configured to decrypt the first portion using a decryption key of the second service. In some embodiments, the at least one processor may be configured to determine whether the decrypted first portion matches with information in the request. In certain embodiments, the at least one processor may be configured to send, via the transceiver, the response to the request, if the decrypted first portion matches with the information in the request.

In certain embodiments, at least a first portion of the value may be encrypted using an encryption key of the second service. In some embodiments, at least a first portion of the value may be further encrypted using an encryption key of the agent of the second service. In certain embodiments, the at least one processor may be configured to decrypt the first portion using a decryption key of the second service, and a decryption key of the agent of the second service. In some embodiments, the at least one processor may be configured to determine whether the decrypted first portion matches with information in the request. In certain embodiments, the at least one processor may be configured to send, via the transceiver, the response to the request, if the decrypted first portion matches with the information in the request.

In certain embodiments, at least a first portion of the value may be encrypted using a cryptographic salt of the agent of the second service. In some embodiments, the at least one processor may be configured to receive, via the transceiver, the cryptographic salt in the request. In certain embodiments, the at least one processor may be configured to decrypt the first portion using the cryptographic key and the cryptographic salt. In some embodiments, the record may be created in the storage by the agent of the second service. In some embodiments, the record may correspond to the transaction that is being requested. In certain embodiments, the first service and the second service may each comprise a micro-service. In some embodiments, the identifier may comprise a globally unique identifier. In certain embodiments, and according to the identifier, the at least one processor may be configured to determine that the record is absent from the storage. In some embodiments, the at least one processor may be configured to reject or ignore the request if the record is absent from the storage.

In one aspect, the present disclosure is directed to a non-transitory computer readable medium storing program instructions. The program instructions stored in a non-transitory computer readable medium may cause at least one processor to receive via a transceiver, a request from a second service for the first service to perform a transaction. The request may include an identifier of a record. The program instructions may cause the at least one processor to determine, according to the identifier, whether the record is present in a storage. The storage may be accessible using credentials of an agent of the first service and an agent of the second service. The program instructions may cause the at least one processor to send, via the transceiver, a response to the request if the record is present in the storage.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

In some applications, one or more keys (e.g., service keys, such as a symmetric key pair) may be used to authorize transactions (e.g., intra-platform service transactions, requests for data retrieval or production of information, and/or other types of transaction) between services of a system (e.g., services executing on at least one server of the system). In certain scenarios, a certificate (e.g., an X509 certificate, and/or other types of certificates) can be used to establish a channel (e.g., a secured channel for performing transactions) between the services. In certain cases, an attacker and/or a malicious entity may gain access to (or otherwise obtain) the key and/or the certificate (e.g., to obtain via an unauthorized request). In a scenario in which an attacker obtains the key and/or the certificate, an administrator of the system, for example, may be unaware that the key/certificate has been leaked or compromised (e.g., obtained by the attacker and/or malicious entity). In one example, the administrator can remain unaware of said leak for a period of time, such as until the administrator discovers that the attacker has accessed, used and/or obtained the key/certificate. As such, during said period of time, the system can be exposed (e.g., have increased vulnerability) to security risks, threats and/or attacks. The systems and methods presented herein can provide protection against said attacks and/or threats, for example, by determining whether one or more requests within the system originated from a trusted, authenticated and/or authorized entity (e.g., a trusted service).

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for performing secure transactions.

A. Network and Computing Environment

Figure 1A:
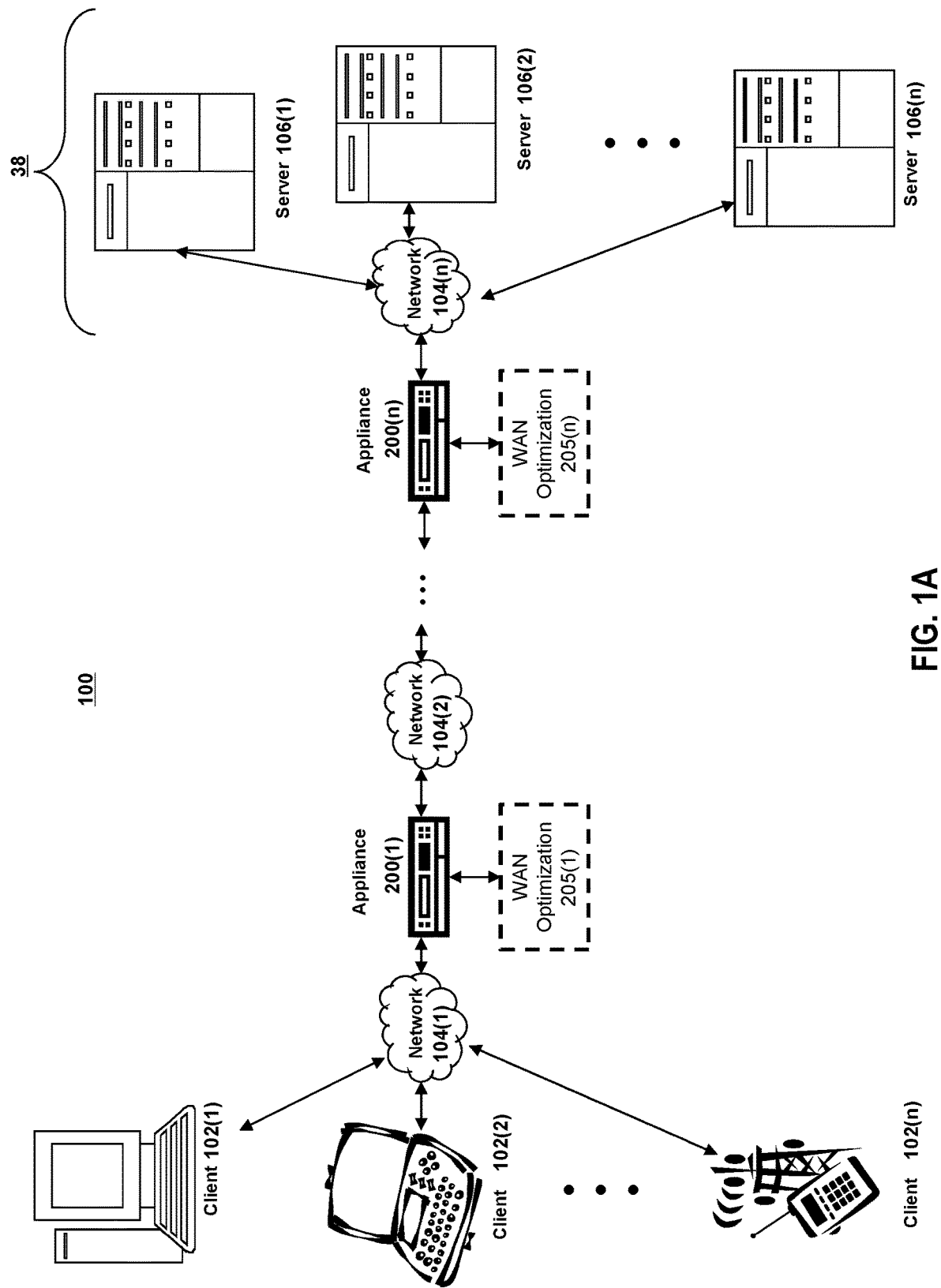
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106.

In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
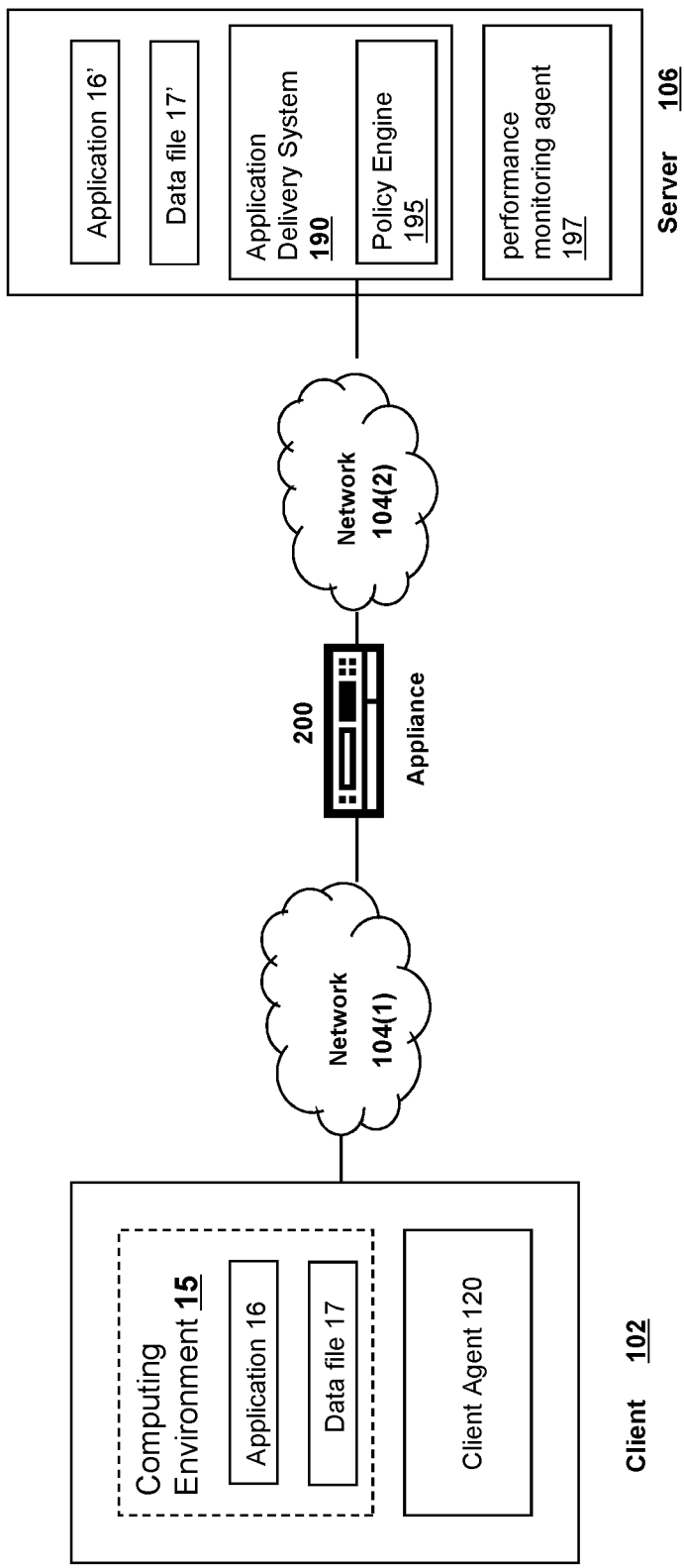
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
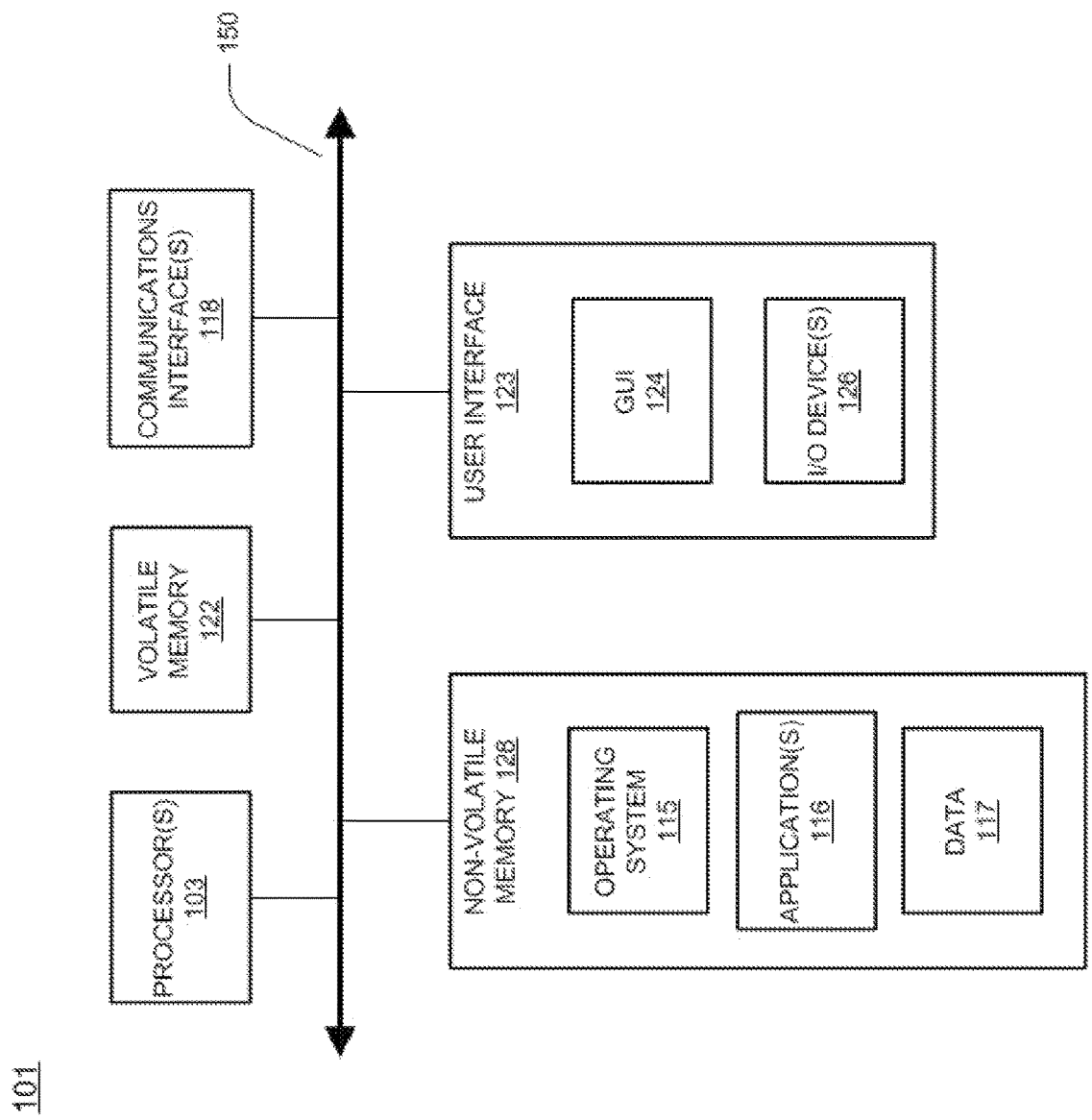
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

Figure 1D:
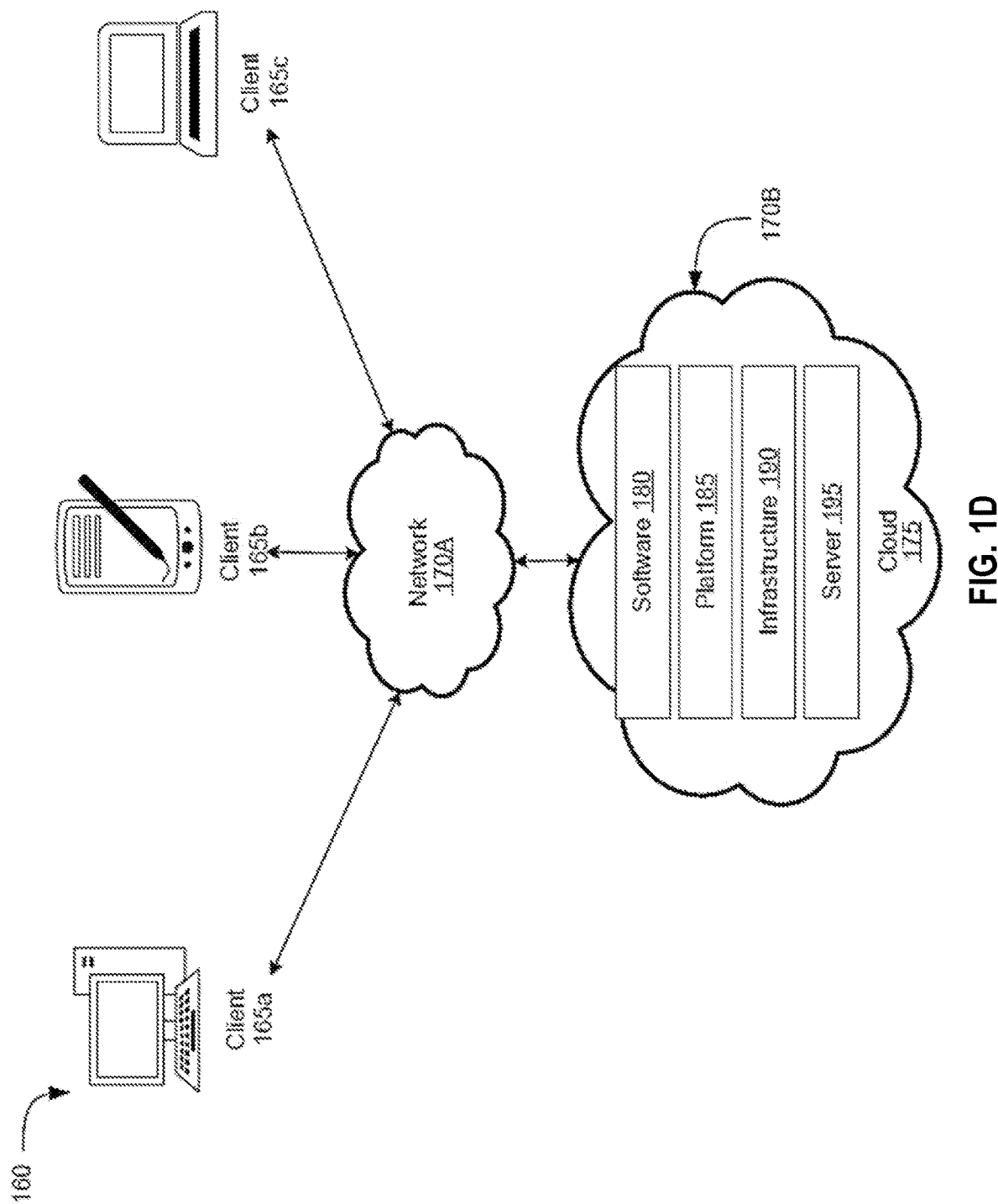
FIG. 1D is a block diagram depicting a computing environment comprising client device in communication with cloud service providers, in accordance with an illustrative embodiment.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1C.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
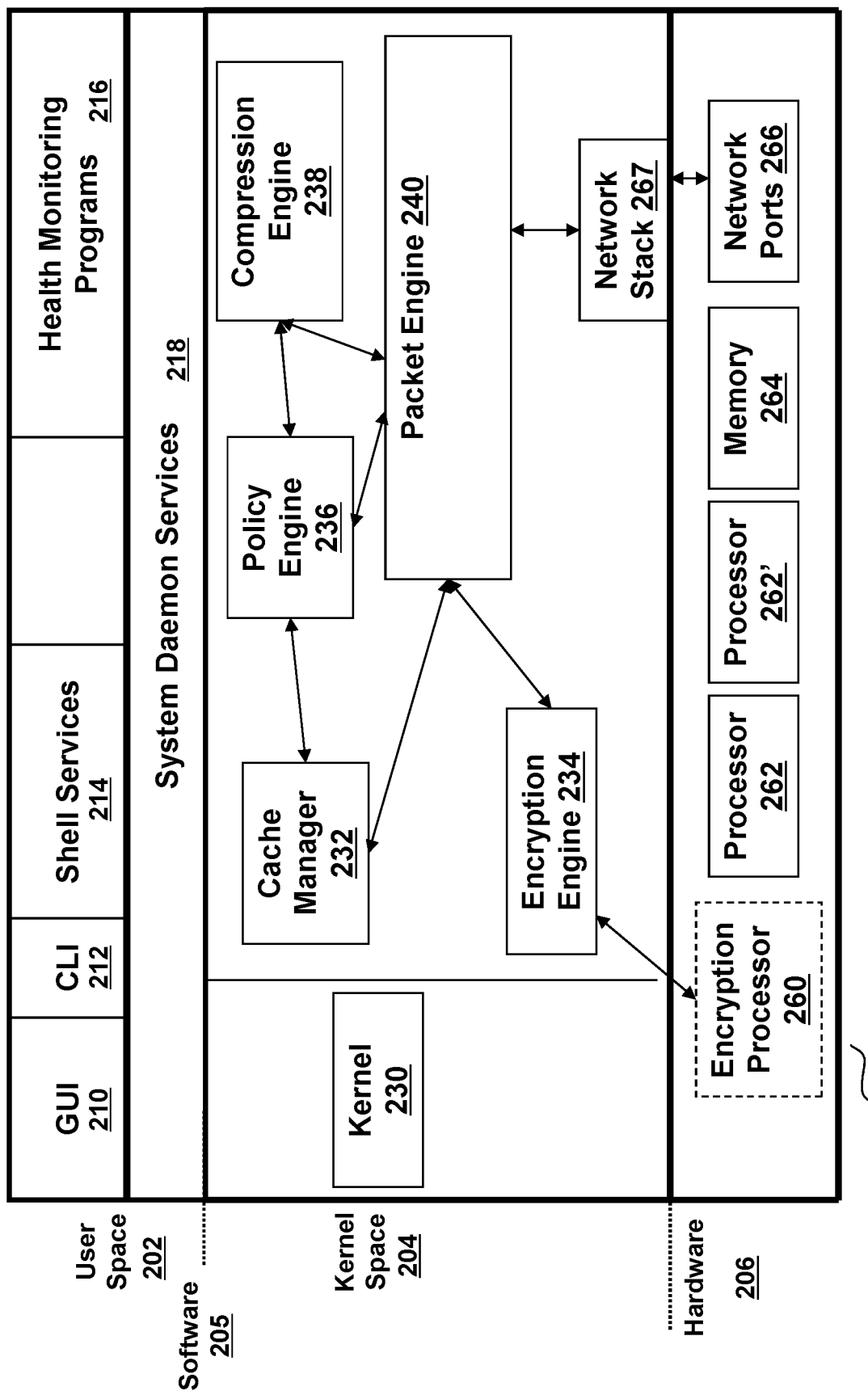
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Performing Secure Transactions

The present disclosure is directed towards systems and methods for performing secure and/or authorized transactions (e.g., a set of operations on data) between services (e.g., micro services, desktop services, and/or hosted services, such as IaaS, DaaS, WaaS, SaaS and/or PaaS). For instance, the systems and methods described herein can include one or more agents of at least one service (e.g., a trust module and/or component comprising executable library/software elements, modules and/or components, executing on hardware). The agent(s) of the service(s) may create and/or generate a record (e.g., an entry, in a database/list/table/data-structure) for each transaction between at least two services. In one example, the agent(s) may add, incorporate, store and/or maintain said record in one or more storages (e.g., one or more transient storages, such as a transient storage for each service). Each stored record (e.g., stored and/or maintained in the storage(s)) may have a time to live (TTL) (e.g. a limit on the lifespan, validity and/or lifetime of the stored record within the storage(s)).

In one example, a second service (e.g., service A) may send, transmit, communicate and/or broadcast a request to a first service (e.g., service B). The request may include or correspond to a request for the service (e.g., the first service) to perform at least one transaction. The second service can use an agent (e.g., a trust module) of the second service to generate and/or create a record associated with (or corresponding to) the transaction. The agent of the second service may add, include and/or incorporate said record into one or more storages (e.g., one or more transient storages). In certain embodiments, the record may include or correspond to a key-value pair. The key of the key-value pair may include or correspond to an identifier of the record. The identifier of the record may be a randomized globally unique identifier (GUID) and/or other types of identifiers. The value of key-value pair may include or correspond to a value of the record. The value of the record may include an identifier of the transaction (e.g., a unique transaction ID and/or session ID), a uniform resource locator (URL) of the request (e.g., request URL) and/or an identifier of the second service (e.g., a unique identifier of the second service). In one example, the value of the record may be encrypted and/or encoded (e.g., prior to storing the value of the record in the storage(s)). The value of the record can be encrypted with (or by using) an encryption key (e.g., a private key) of the second service. In certain embodiments, the request sent by the second service (e.g., to the first service) may include and/or provide (e.g., provide to the first service) the identifier of the record (e.g., GUID). For example, a header of the request (e.g., a header of a Hypertext Transfer Protocol (HTTP) request, and/or an Application Programming Interface (API) request) may include and/or provide the identifier of the record, and/or other information.

In certain embodiments, the first service (e.g., service B) may receive and/or obtain the request (e.g., request to perform a transaction) from the second service (e.g., service A). Responsive to receiving the request, an agent of the first service may determine and/or identify whether the record (e.g., the record associated with the transaction) is present (e.g., is maintained and/or stored) in the storage. For example, the agent of the first service may use the identifier of the record (e.g., provided via the request sent by the second service) to determine whether the record is present in the storage (e.g., by locating the record using the identifier). In one example, the agent of the first service may determine whether the storage(s) include, maintain and/or store an identifier corresponding to the identifier of the record (e.g., provided via the request). If the record is present in the storage(s), the first service may send, transmit and/or communicate a response to the request. If instead, the record is absent from the storage(s), the first service may ignore/reject the request, and/or flag/identify the request for further inspection (e.g., to determine whether the request poses a cybersecurity risk and/or threat).

In certain embodiments, the agent of the first service may use a decryption key (e.g., a public key) of the second service to decrypt at least a portion of the value of the record (e.g., present in the storage). In one example, the value of the record can be encrypted (e.g., encrypted by an agent of the second service and/or other components of the second service) using an encryption key of the second service. In certain embodiments, the first service (e.g., the agent and/or other components of the first service) may compare the decrypted version of the value of the record (e.g., present in the storage) with information in the request (e.g., an incoming request). For instance, the decrypted version of the value of the record (e.g., the value present in the storage) may include and/or provide the identifier of the transaction, the URL of the request and/or the identifier of the second service. As such, the first service (e.g., an agent of the first service) may compare the identifier of the transaction, the URL of the request and/or the identifier of the second service (e.g., obtained via decryption of the value of the record present in the storage) to an identifier of a transaction associated with an incoming request, a URL of an incoming request and/or an identifier of the second service provided by an incoming request. If the corresponding values (e.g., identifiers of the transactions, URLs of the requests and/or identifiers of the second service) match (e.g., values correspond to each other), which can validate the request or the sender of the request, the first service may send, transmit and/or communicate a response to the request.

In some embodiments, an agent of the service (or other components of the service, such as an encryption engine) may encrypt at least a portion of the value of the record (e.g., an identifier of the transaction, a URL of the request and/or an identifier of the second service) using a cryptographic salt of the agent (and/or other salts or encryption keys). A cryptographic salt may include or correspond to a randomized number. In certain embodiments, the cryptographic salt may be generated in platform properties files. Using a cryptographic salt to encrypt at least a portion of the value of the record may improve, enhance, and/or increase the security of the performed transactions. For instance, in a scenario in which an attacker obtains a key and/or certificate (e.g., for performing secure transactions and/or establishing a channel between services), the attacker may be unable to carry out an attack, given than the attacker without knowledge of the salt may be unable to access the storage with the record. Furthermore, the attacker may be unable to provide the identifier of the record (and/or other information/credentials) for validating a request to perform a transaction.

Figure 3:
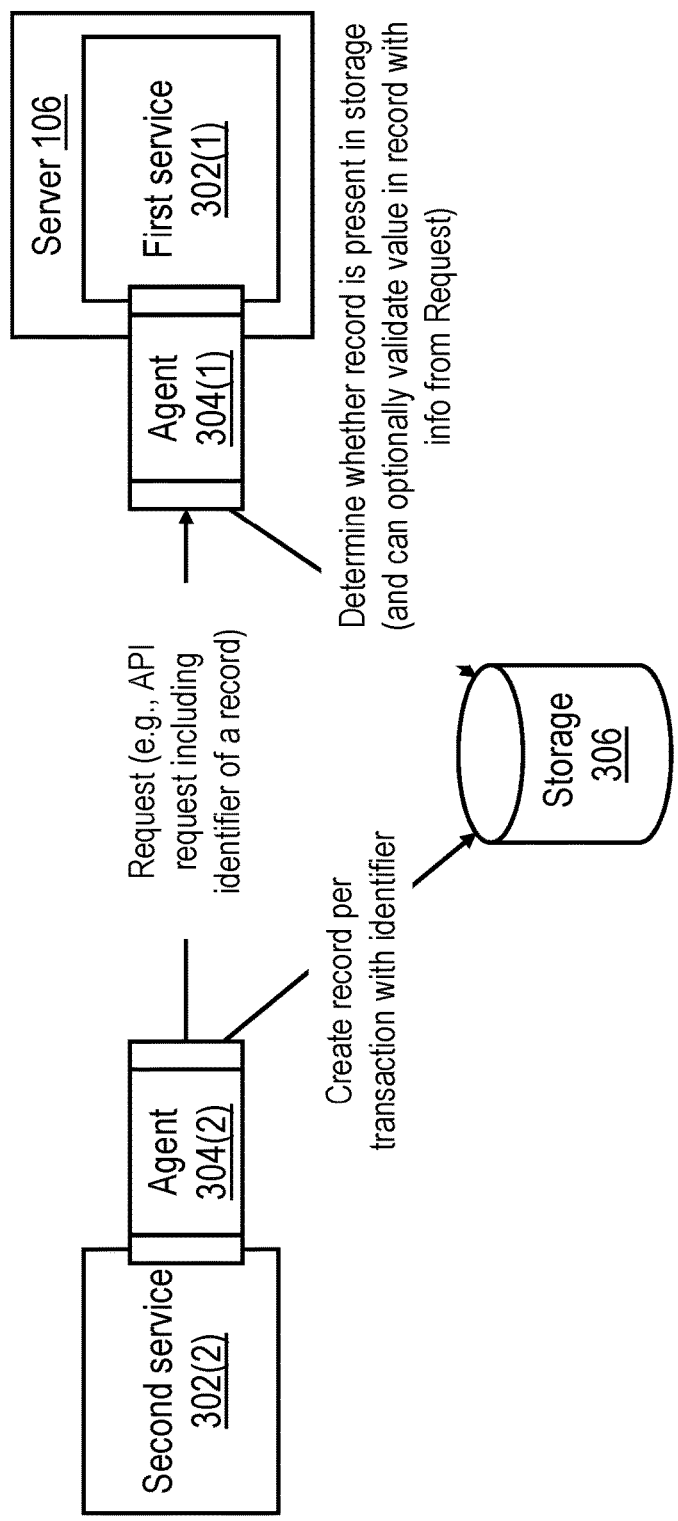
FIG. 3 is a block diagram of a system for performing secure transactions, in accordance with an illustrative embodiment.

In view of the above discussion regarding performing secure transactions, a process and/or system for performing said transactions may be beneficial, as further explained in the following passages. Referring to FIG. 3, depicted is a block diagram of one example embodiment of a system 300 for performing secure and/or authorized transactions between services 302. The system 300 may include one or more services 302 (e.g., a first service 302(1) and/or a second service 302(2)), one or more agents of a service 304 (e.g., agent of a first service 304(1) and/or agent of a second service 304(2)), one or more storages 306, one or more servers 106, and/or other components. The server(s) 106 can include or maintain or have access to one or more services (e.g., first service 302(1) and/or second service 302(2). For instance, the first service 302(1) and/or the second service 302(2) may execute on at least one server 106 (e.g., a same server 106 and/or distinct servers 106).

Each of the above-mentioned elements or entities is implemented in hardware, or a combination of hardware and software, in one or more embodiments. Each component of the system 300 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

The system 300 may include one or more servers 106. One or more of the server(s) 106 (e.g., a back-end server supporting HTTPS messages or transactions, and/or other servers 106) may be configured and/or designed to host one or more services 302 (e.g., micro services and/or application resources, such as a web application, SaaS application, PaaS application, and/or a remote-hosted network application). The server 106 may be configured and/or designed to provision and/or execute the one or more services 302 (or provision user interfaces through which to access the service(s) 302) to one or more clients 102 (e.g., one or more mobile devices, tablets, desktops, and/or other clients 102) of a consumer or other entity (e.g., an organization or a user of the client device 102) via one or more networks 104. For example, the client 102 may establish one or more sessions or connections (e.g., secured or otherwise, such as a SSL virtual private network connection) with the server(s) 106 to access a service 302, such as a micro service. In another example, the server(s) 106 may receive/obtain a request (e.g., such as a HTTP request and/or API request) from a client device 102, for example, to access, use and/or provision one or more services 302 (or establish the connections to access the one or more services 302).

To provide a service 302, the server(s) 106 may execute, provide, provision, and/or host one or more network application(s). In some embodiments, a service 302 may be referred to interchangeably with an application, a resource, an application resource or network application. A network application can for instance include a remote-hosted application, a remote-hosted desktop, a web application or a software-as-a-service (SaaS) application. A remote-hosted desktop may be a virtual desktop hosted on the server 106 which is accessed by or remotely provisioned to a client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

In some embodiments, the server(s) 106 can be part of a cloud or datacenter for instance. In some embodiments, the server(s) 106 may include any embodiment of volatile memory 122 or non-volatile memory 128 (discussed in FIG. 1C for example) which may store files, data and/or content of the service. The server(s) 106 may communicate with other various components of the system 300 in FIG. 3 via a communications interface 118 for instance. Hence, the server(s) 106 may be similar in some aspects to the computer 101 described with reference to FIG. 1C.

The system 300 may include one or more service(s) 302. In certain embodiments, the service(s) 302 may comprise one or more components, such as programs, functions, applications or micro services used to provide the service 302. In some embodiments, a first service 302(1) may receive and/or obtain a request from a second service 302(2). The first service 302(1) and/or the second service 302(2) may execute on at least one server 106. The first service 302(1) and/or the second service 302(2) may each comprise a micro-service. In some embodiments, the request may include or correspond to a request to perform a transaction (e.g., a transaction between a first service 302(1) and a second service 302(2)). The request may include, provide, indicate and/or specify an identifier of a record (e.g., a GUID and/or other identifier) and/or other information. In certain embodiments, the first service 302(1) may determine, according to the identifier, whether the record is present in at least one storage 306. In certain embodiments, the first service 302(2) may access at least one storage 306 by using (or according to) credentials of the agent of the first service 304(1). In one example, the first service 302(1) may send, transmit, broadcast and/or communicate a response to the request if the record is present in the storage(s) 306.

In some embodiments, a service 302 (e.g., first service 302(1) and/or second service 302(2)) may comprise micro services, each providing one or more functions, functionality or operations of a service 302. In some aspects, micro services can be a form of service-oriented architecture style, wherein applications are built as a collection of different smaller services rather than one whole or singular application (e.g., referred to sometimes as a monolithic application). Instead of a monolithic application, a service 302 may have several independent applications or services (e.g., micro services) that can run on their own. The several independent applications or services may be created using different coding or programming languages. As such, a larger server 106 can be made up of simpler and independent programs or services that are executable by themselves. These smaller programs or services are grouped together to deliver the functionalities of the larger service 302. In some aspects, a micro services-based service can structure an application as a collection of services 302 that can be loosely coupled. The benefit of decomposing a service 302 into different smaller services is that it improves modularity. Modularity can make the application and/or service 302 easier to understand, develop, test, and/or, improve the resiliency to changes in architecture or deployment.

A micro service may include an implementation of one or more functions and/or functionality. A micro service may be a self-contained piece of business function(s) with clear or established interfaces, such as an API. In some implementations, a micro service may be deployed in a virtual machine and/or a container. A service 302 (e.g., a first service 302(1) and/or a second service 302(2)) may use one or more functions of one micro service and another one or more functions of a different micro service. In operating or executing a service 302, one micro service (e.g., a first micro service) may make API calls to another micro service (e.g., second micro service), and the micro service may provide a response via an API call, event handler and/or other interface mechanism. In operating or executing a micro service, the micro service may make an API call to another micro service, which in its operation or execution, makes a call to another micro service, and so on.

The system 300 may include at least one agent of the service(s) 304. In some embodiments, the agent(s) 304 may be integrated with (e.g., reside within or as part of) at least one service 302. In certain embodiments, the agent(s) 304 can be adjacent and/or external to (e.g., in communication with) at least one service 302. In some embodiments, a particular agent 304 (e.g., an agent of the first service 304) may be associated with (or correspond to) a particular service 302 (e.g., a first service 302(1)). In some embodiments, an agent 304 may include or correspond to a trust module and/or component. The agent 304 may comprise one or more executable library/software elements, modules, and/or components. In certain embodiments, an agent of the first service 304(1) (e.g., a built-in agent and/or an external agent) may determine whether a record is present or absent in the storage(s) 306. For example, the agent of the service 304 may determine whether the record is present in the storage 306 according to the identifier of the record. For instance, the agent of the service 305*4* can attempt to locate, detect and/or identify the record in the storage(s) 306 based on the received identifier of the record (e.g., by attempting to locate a matching identifier in the storage(s) 306, or using the identifier to index into a database of the storage(s) 306). In certain embodiments, the first service 304(1) may access the storage(s) 306 using credentials of the agent of the first service 304(1) and/or the agent of the second service 304(2).

The system 300 may include at least one storage 306. The storage(s) 306 can be accessible to the first service 302(1) and/or the second service 302(2). In certain embodiments, the first service 302(1) and/or the second service 302(2) can access and/or use the storage(s) 306 by using (or according to) credentials of the first service 302(1) and/or the second service 302(2). In some embodiments, the credentials of the first service 302(1) may correspond to the credentials of the second service 302(1). In certain embodiments, the credentials of the first service 302(1) may be separate and/or distinct from the credentials of the second service 302(1). In certain embodiments, a storage 306 may store and/or maintain a corresponding record for each request sent by a service 302 (e.g., a request to perform a transaction). A record may include or correspond to an entry (e.g., a data entry) stored and/or maintained in one or more storages 306, wherein the entry can be associated with a transaction originating from an authorized service 302. In certain embodiments, the storage 306 can be a transient storage. As such, the transient storage may store the record(s) for a predetermined time period, and therefore, the record(s) can be discarded once the time period has elapsed. In certain embodiments, each service 302 of the system 300 can have a corresponding storage 306.

Figure 4:
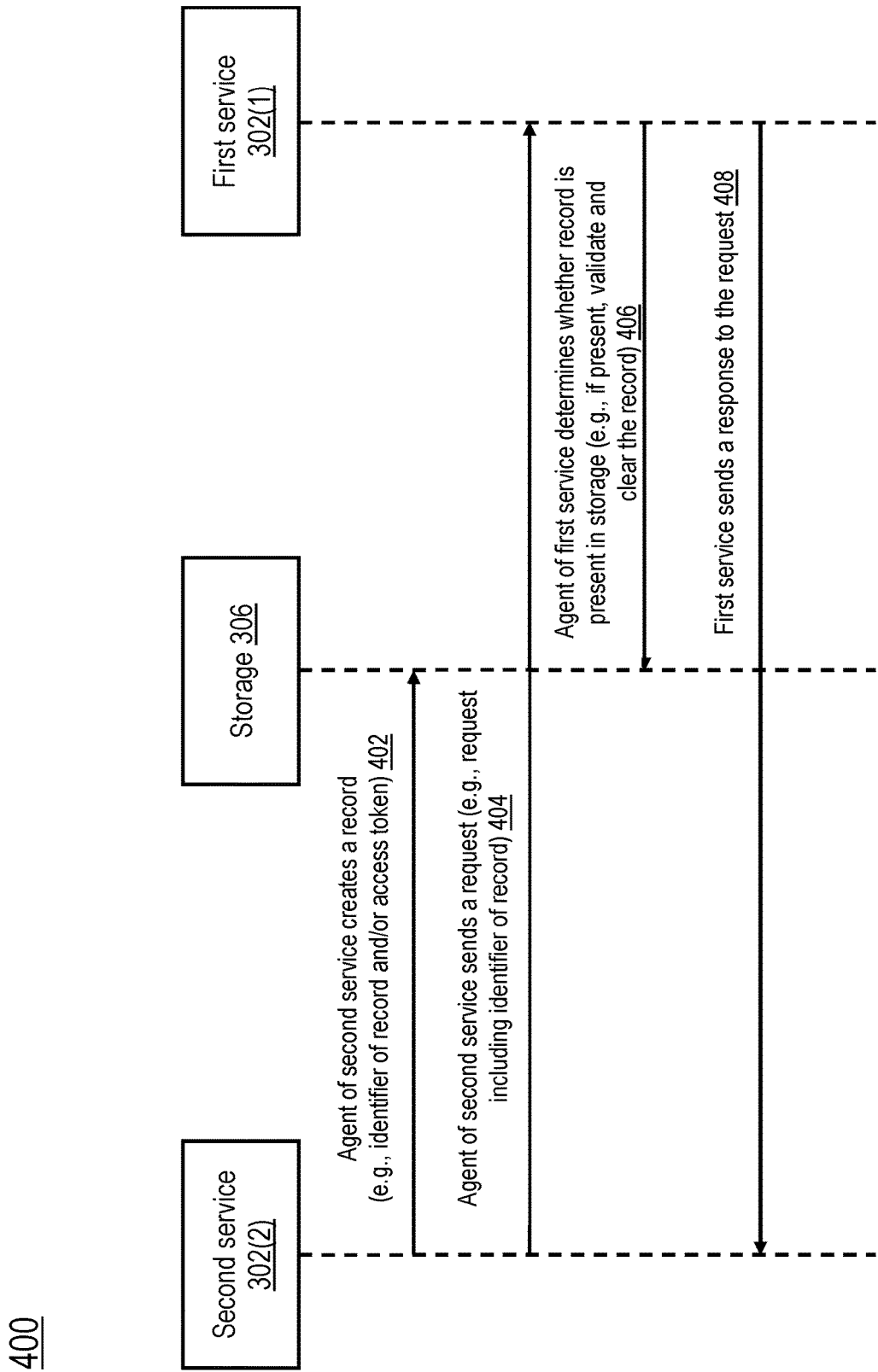
FIG. 4 is a diagram of a process for performing secure transactions, in accordance with an illustrative embodiment.

Referring now to FIG. 4, depicted is a communication diagram of an embodiment of a process 400 for performing secure transactions between services 302. The functionalities of the process may be implemented using, or performed by, the components detailed herein in connection with FIGS. 1-3. In accordance with process 400, the agent of the second service 304(2) may create and/or generate a record (402). The record may include an identifier of the record (e.g., a GUID) and/or an access token. In certain embodiments, the agent of the second service 304(2) may send and/or transmit a request to the first service 302(1) (404). The request can be a request to perform a transaction (e.g., retrieval of information, performance of a task), and may include the identifier of the record. In certain embodiments, the agent of the first service 304(1) may determine whether the record is present in the storage 306 (406). For instance, the agent of the first service 304(1) may access the storage 306 to attempt to locate the record (e.g., according to the received identifier). If the record is present in the storage 306, the first service 302(1) may send a response to the request to the second service 302(2) (408). The response may indicate an authorization to perform the transaction, and/or may trigger the transaction.

Figure 5:
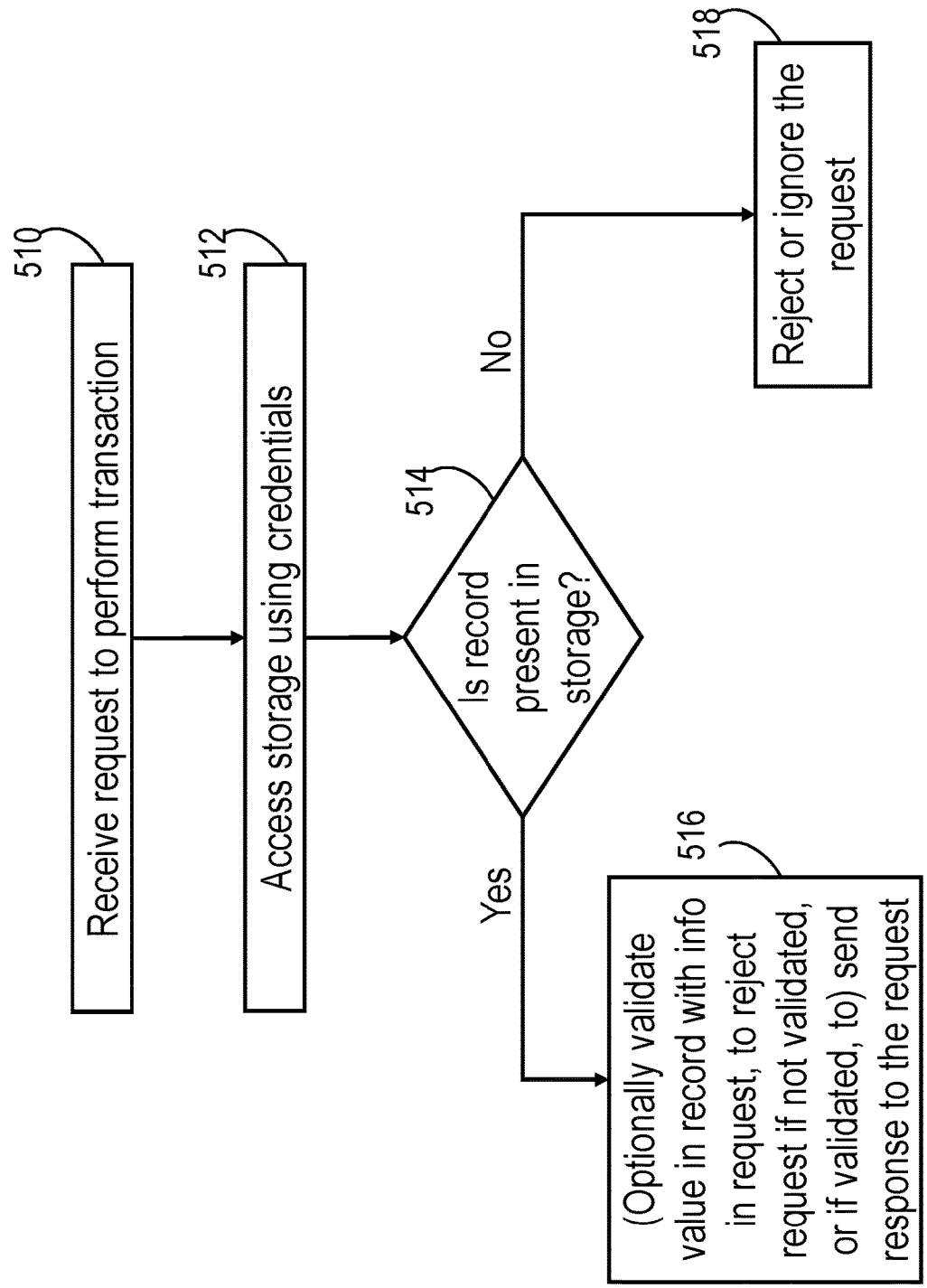
FIG. 5 is a flow diagram of an example method for performing secure transactions, in accordance with an illustrative embodiment.

Referring to FIG. 5, depicted is a flow diagram 500 of one embodiment of a method for performing secure transactions between services. The functionalities of the method may be implemented using, or performed by, the components detailed herein in connection with FIGS. 1-4. In brief overview, a first service 302(1) executing on at least one server may receive a request to perform a transaction (510). An agent of the first service 304(1) may access a storage 306 (512). The agent of the first service 304(1) may determine whether the record is present in the storage 306 (514). The first service 302(1) may send a response to the request (516). The first service 302(1) may reject and/or ignore the request (518).

Referring now to operation (510), and in some embodiments, a first service 302(1) (e.g., micro service, IaaS, DaaS, WaaS, SaaS and/or PaaS) may receive and/or obtain a request from a second service 302(2). The first service 302(1) may execute on at least one server 106. The first service 302(1) and/or the second service 302(2) may each comprise a micro-service. In some embodiments, the request may include or correspond to a request to perform a transaction (e.g., a transaction between a first service 302(1) and a second service 302(2)). The request may include, provide, indicate and/or specify an identifier of a record (e.g., a GUID and/or other identifiers) and/or other information. A record may include or correspond to an entry (e.g., a data entry) stored and/or maintained in one or more storages 306, wherein the entry can be associated with a transaction originating from an authorized service. In some embodiments, the record may be created (or included) in the storage(s) 306 by the agent of the second service 304(2) (e.g., the agent originating the request). In some embodiments, the record may correspond to (or be associated with) the transaction that is being requested. As such, a corresponding record is created in the storage(s) 306 for each request (e.g., request to perform a transaction) sent by the second service 302(2). Responsive to receiving the request, and in some embodiments, an agent of the first service 304(1) (e.g., a trust module/component comprising one or more executable library elements and/or modules) may access a storage 306 (512). For instance, the agent of the first service 304(1) may access and/or use the storage 306 according to (or by using) credentials of the agent (e.g., a username, a password, a personal identification number, an authentication token, a string and/or other types of credentials). As such, an entity (e.g., an attacker) may be unable to access and/or use the storage 306 without providing and/or using valid credentials to access the storage 306.

Referring now to operation (514), and in some embodiments, an agent of the first service 304(1) may determine whether the record is present in at least one storage 306. For instance, the agent of the first service 304(1) may determine whether the record is present in a storage 306 accessible to the first service 302(1) and the second service 302(2). In some embodiments, the agent of the first service 304(1) may determine whether the record is present in the storage(s) 306 according to (or based on) the identifier of the record (e.g., a globally unique identifier received by the first service 302(1) via the request from the second service 302(2)). For example, the agent of the first service 304(1) may determine whether the storage(s) 306 include a stored identifier corresponding to the received identifier of the record. In one example, the agent of the first service 304(1) may determine whether the storage(s) 306 include a stored record associated with the received identifier of the record. In some embodiments, the storage(s) 306 may be accessible (e.g., accessible for storing and/or searching stored data, such as records and identifiers) using credentials of the agent of the first service 304(1) and/or an agent of the second service 304(2). As described above, the agent of the first service 304(1) may access the storage(s) 306 (e.g., to determine whether the record is present in the storage(s) 306) by providing or otherwise using credentials (e.g., username and/or password) specific to the agent of the first service 304(1). In one example, the agent of the second service 304(2) may access the storage(s) 306 (e.g., to store, include, and/or add a record) by providing or otherwise using credentials specific to the agent of the second service 304(2). In certain embodiments, the credentials of the first service 302(1) may correspond to the credentials of the second service 302(2). In certain embodiments, the agent of the first service 304(1) may determine whether the record is present in the storage(s) 306 by locating, detecting and/or identifying the record in the storage(s) 306 using (or based on) the identifier.

Referring now to operation (516), and in some embodiments, the first service 302(1) may send, transmit, communicate, broadcast or otherwise provide a response to the request (e.g., the request received from the second service 302(2)). For instance, responsive to determining (e.g., by the agent of the first service 304(1)) that the record is present (e.g., stored, included and/or maintained) in the storage(s) 306, the first service 302(1) may send and/or transmit a response to the request (e.g., send to the second service 302(2) or other services). By sending the response, the first service 302(1) may provide authorization and/or approval to perform a transaction between the first service 302(1) and the second service 302(2). In one example, the agent of the first service 304(1) may determine that the record is absent from the storage(s) 306 (514). For instance, the agent of the first service 304(1) may determine that the record is absent from (or non-existent in) the storage(s) 306 according to (or based on) the identifier of the record (e.g., received by the first service 302(1) via the request from the second service 302(2)). Specifically, the agent of the first service 304(1) may determine that an identifier corresponding to the received identifier of the record is absent from the storage(s) 306. Responsive to determining that the record is absent from the storage(s) 306, and in some embodiments, the first service 302(1) may reject, decline and/or ignore the request (518). By rejecting and/or ignoring the response, the first service 302(1) may deny to provide authorization and/or approval to perform a transaction between the first service 302(1) and the second service 302(2). In certain embodiments, the record is absent from the storage 306 because the record has been removed and/or deleted from the storage 306 in accordance with an expiration of a time-to-live (TTL) duration of the record. In one example, the record is absent from the storage 306 because the record was never established (or incorporated) into the storage 306 by the agent of the second service 304(2) (e.g. no request was ever initiated/sent in association with the provided record). A record being absent from the storage 306 may indicate that the received request (e.g., received by the first service 302(1)) may be a malicious request (e.g., a request from an attacker or malicious entity).

In one example, a value of the record may include at least one of: an identifier of the transaction (e.g., a unique transaction ID and/or session ID), an identifier of the second service 302(2) (e.g., a unique name of the second service 302(2)), a URL of the request (e.g., a request URL of a HTTP request), and/or other information. In certain embodiments, the value of the record may include a signed version (e.g., encrypted/encoded/watermarked version) of the request, including the URL of the request and/or the identifier of the second service 302(2). In some embodiments, at least a first portion of the value may be encrypted and/or encoded (e.g., encrypted or encoded by the second service 302(2), such as by an encryption engine of the second service 302(2)). For example, at least a first portion of the value of the record can be encrypted by using (or according to) an encryption key of the second service 302(2) (e.g., a private key). In certain embodiments, the agent of the first service 304(1) may decrypt the first portion using a decryption key of the second service 302(2) (e.g., received via the request). As such, a service may be unable to obtain and/or determine the value of the record (e.g., present in the storage(s) 306) if the service is not provided with a correct decryption key. Indeed, said service may be able to determine that a received request is sent by an attacker (or malicious entity) if a correct decryption key is absent. In some embodiments, responsive to decrypting the first portion, the agent of the first service 304(1) may determine whether the decrypted first portion matches with (e.g., overlaps or corresponds to) information in the request (e.g., information in a header of the request, such as a transaction ID, an identifier of the second service 302(2), and/or a URL request). In certain embodiments, the first service 302(1) may send, transmit and/or communicate the response to the request (e.g., provide authorization to perform a transaction), if the decrypted first portion matches with the information in the request.

In certain embodiments, and as discussed above, at least a first portion of the value may be encrypted using an encryption key of the second service 302(2) (e.g., a private key). In some embodiments, the first portion of the value may be further encrypted using an encryption key of the agent of the second service 304(2). In certain embodiments, the agent of the first service 304(1) may decrypt the first portion using the decryption key of the second service 302(2), and/or a decryption key of the agent of the second service 304(2). In some embodiments, the agent of the first service 304(1) may determine whether the decrypted first portion matches with (e.g., overlaps or corresponds to) information in the request (e.g., information in a header of the request, such as a session ID, an identifier of the second service 302(2), and/or a URL request). In certain embodiments, the first service 302(1) may send the response to the request, if the decrypted first portion matches with the information in the request. In certain embodiments, at least a first portion of the value may be encrypted (e.g., encrypted by the agent of the second service 304(2)) using a cryptographic salt (e.g., a randomized number and/or string) of the agent of the second service 304(2). In some embodiments, the first service 302(1) may receive and/or obtain the cryptographic salt in the request (e.g., the request from the second service 302(2)). In certain embodiments, the agent of the first service 304(1) may decrypt the first portion using the cryptographic key and/or the cryptographic salt. In some embodiments, the agent of the first service 304(1) may determine whether the decrypted first portion matches with (e.g., overlaps or corresponds to) information in the request (e.g., information in a header of the received request, such as a session ID, an identifier of the second service 302(2), and/or a URL request). If the decrypted first portion matches with the information in the request, the first service 302(1) may transmit the response to the request.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A method comprising:
receiving, by a first service executing on at least one server, a request from a second service for the first service to perform a transaction, the request including an identifier of a record;
determining, by an agent of the first service according to the identifier, whether the record is present in a storage, the storage accessible using credentials of the agent of the first service and an agent of the second service; and
sending, by the first service, a response to the request if the record is present in the storage.

2. The method of claim 1, comprising:
accessing, by the agent of the first service, the storage using the credentials of the agent of the first service; and
locating, by the agent of the first service, the record in the storage using the identifier.

3. The method of claim 1, wherein:
the request includes an encoded and encrypted signature of the second service, and
a value of the record includes at least one of: an identifier of the transaction, an identifier of the second service, or a uniform resource locator (URL) of the request.

4. The method of claim 3, wherein at least a first portion of the value is encrypted using an encryption key of the second service, and the method comprises:
decrypting, by the agent of the first service, the first portion using a decryption key of the second service;
determining, by the agent of the first service, whether the decrypted first portion matches with information in the request; and
sending, by the first service, the response to the request, if the decrypted first portion matches with the information in the request.

5. The method of claim 3, wherein at least a first portion of the value is encrypted using an encryption key of the second service, and further encrypted using an encryption key of the agent of the second service, and the method comprises:
decrypting, by the agent of the first service, the first portion using a decryption key of the second service, and a decryption key of the agent of the second service;
determining, by the agent of the first service, whether the decrypted first portion matches with information in the request; and
sending, by the first service, the response to the request, if the decrypted first portion matches with the information in the request.

6. The method of claim 3, wherein at least a first portion of the value is encrypted using a cryptographic salt of the agent of the second service, and the method comprises:
receiving, by the first service, the cryptographic salt in the request; and
decrypting, by the agent of the first service, the first portion using a cryptographic key and the cryptographic salt.

7. The method of claim 1, wherein the record is created in the storage by the agent of the second service, and corresponds to the transaction that is being requested.

8. The method of claim 1, wherein:
the first service and the second service each comprises a micro-service,
and the identifier comprises a globally unique identifier.

9. The method of claim 1, comprising:
determining, by the agent of the first service according to the identifier, that the record is absent from the storage; and
rejecting or ignoring, by the first service, the request if the record is absent from the storage.

10. The method of claim 1, wherein the record is absent from the storage because:
the record has been removed from the storage in accordance with an expiration of a time-to-live duration of the record, or
the record was never established into the storage by the agent of the second service.

11. A device comprising:
at least one processor of a first service, configured to:
receive via a transceiver, a request from a second service for the first service to perform a transaction, the request including an identifier of a record;
determine, according to the identifier, whether the record is present in a storage, the storage accessible using credentials of an agent of the first service and an agent of the second service; and
send, via the transceiver, a response to the request if the record is present in the storage.

12. The device of claim 11, wherein the at least one processor is configured to:
access the storage using the credentials of the agent of the first service;
and locate the record in the storage using the identifier.

13. The device of claim 11, wherein:
the request includes an encoded and encrypted signature of the second service, and
a value of the record includes at least one of: an identifier of the transaction, an identifier of the second service, or a uniform resource locator (URL) of the request.

14. The device of claim 13, wherein at least a first portion of the value is encrypted using an encryption key of the second service, and the at least one processor is configured to:
- decrypt the first portion using a decryption key of the second service;
- determine whether the decrypted first portion matches with information in the request; and
- send, via the transceiver, the response to the request, if the decrypted first portion matches with the information in the request.

15. The device of claim 13, wherein at least a first portion of the value is encrypted using an encryption key of the second service, and further encrypted using an encryption key of the agent of the second service, and the at least one processor is configured to:
- decrypt the first portion using a decryption key of the second service, and a decryption key of the agent of the second service;
- determine whether the decrypted first portion matches with information in the request; and
- send, via the transceiver, the response to the request, if the decrypted first portion matches with the information in the request.

16. The device of claim 13, wherein at least a first portion of the value is encrypted using a cryptographic salt of the agent of the second service, and the at least one processor is configured to:
- receive, via the transceiver, the cryptographic salt in the request; and
- decrypt the first portion using a cryptographic key and the cryptographic salt.

17. The device of claim 11, wherein the record is created in the storage by the agent of the second service, and corresponds to the transaction that is being requested.

18. The device of claim 11, wherein:
- the first service and the second service each comprises a micro-service,
- and the identifier comprises a globally unique identifier.

19. The device of claim 11, wherein the at least one processor is configured to:
- determine, according to the identifier, that the record is absent from the storage;
- and reject or ignore the request if the record is absent from the storage.

20. A non-transitory computer-readable medium storing instructions that, when executed by at least one processor of a first service, cause the at least one processor to:
- receive via a transceiver, a request from a second service for the first service to perform a transaction, the request including an identifier of a record;
- determine, according to the identifier, whether the record is present in a storage, the storage accessible using credentials of an agent of the first service and an agent of the second service; and
- send, via the transceiver, a response to the request if the record is present in the storage.

\* \* \* \* \*